US006608902B1

(12) United States Patent
Jackson et al.

(10) Patent No.: US 6,608,902 B1
(45) Date of Patent: Aug. 19, 2003

(54) STEREO SIGNAL SEPARATION CIRCUIT AND APPLICATION THEREOF

(75) Inventors: H. Spence Jackson, Austin, TX (US); Mathew A. Rybicki, Austin, TX (US); Giri Nk Rangan, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 09/019,913

(22) Filed: Feb. 7, 1998

(51) Int. Cl.[7] ............................ H04R 5/00; G06F 17/00
(52) U.S. Cl. ............................................. 381/1; 700/94
(58) Field of Search ................................ 381/1, 17, 18; 700/94

(56) References Cited

U.S. PATENT DOCUMENTS 3,170,991 A * 2/1965 Glasgal ......................... 381/1
3,246,081 A * 4/1966 Edwards ........................ 381/1
3,249,696 A * 5/1966 Sickle ........................... 381/1
4,355,203 A * 10/1982 Cohen ........................... 381/1
4,388,494 A * 6/1983 Schone et al. ................. 381/1
4,748,669 A * 5/1988 Klayman ....................... 381/1
5,297,231 A * 3/1994 Miller ........................ 704/201
5,384,856 A * 1/1995 Kyouno et al. ................ 381/1
5,400,411 A * 3/1995 Lee .............................. 381/1
5,434,921 A * 7/1995 Dombrowski, Jr. et al. .... 381/1
5,440,638 A * 8/1995 Lowe et al. ................... 381/1
5,509,078 A * 4/1996 Hiraoka et al. ................ 381/1
5,515,442 A * 5/1996 Dombrowski, Jr. ............ 381/1
6,130,948 A * 10/2000 Hirano et al. ................ 381/17

* cited by examiner

*Primary Examiner*—Minsun Oh Harvey
*Assistant Examiner*—Laura A. Grier
(74) *Attorney, Agent, or Firm*—Timothy W. Markison

(57) ABSTRACT

A stereo separation circuit includes a pair of amplifiers and a pair of divider circuits. Each of the amplifiers is coupled to receive a stereo signal (e.g., a left stereo signal or a right stereo signal) and the output of the other amplifier through a portion of one of the divider circuits. The other portion of the divider circuit is coupled as feedback across an amplifier. A ratio between the feedback portion of the divider circuit and the other portion of the divider circuit provides a separation ratio. The greater the separation ratio, the greater the perceived audio separation of the stereo signals.

18 Claims, 4 Drawing Sheets

30

30

STEREO SIGNAL SEPARATION CIRCUIT AND APPLICATION THEREOF

TECHNICAL FIELD OF THE INVENTION

This invention relates generally to audio signal processing within a computer system and more particularly to stereo signal separation of the audio signals.

BACKGROUND OF THE INVENTION

Computers are known to include a central processing unit, system memory, audio processing circuitry, and video processing circuitry, which are interoperably coupled to perform a plurality of applications. Such applications include, for example, word processing applications, spread sheet applications, drawing applications, database applications, computer games, multi-media programs, and audio programs. To process a particular application, the central processing unit executes programming instructions that define the application. While executing the programming instructions, the central processing unit evokes the other elements to perform a specific task. For example, assume that a multi-media application is being executed. In this example, the central processing unit evokes the video processing circuitry to render the video portions of the application on a computer display, and evokes the audio processing circuitry to render the audio portions of the application audible. In addition, the central processing unit may instruct the audio processing circuitry to digitize received audible signals and provide it to system memory.

As can be seen from this brief example, the audio processing circuitry has two functions: convert received audible signals (which are received via a microphone, CD player, or other audible input source) into digitized audio signals and to convert digitized audio signals (which are received from the central processing unit) into analog audio signals. The analog audio signals are then provided to a speaker, which renders the signals audible.

The converted analog audio signals may be monotone signals or a stereo signals. If the signals are stereo signals, a portion of the signals (e.g., the left channel) are provided to one speaker, while the remaining portions (e.g., the right channel) are provided to another speaker. While stereo signals provide for a richer sound, when the speakers are physically close to each other, the benefits of stereo are minimized. In other words, when the left and right speakers are physically close to each other, the resulting audible signal is very close to a monotone signal, thereby substantially reducing the benefits of stereo signals. In a computer system, the speakers are relatively close to each other, thus, due to the physical nature of the computer, the benefits of stereo is minimized.

Stereo separation techniques provide a greater stereo effect, which help recapture the stereo effects when the speakers are too close to each other. Such stereo techniques scale, delay, and mix the left and right channel signals to achieve the desired results and are described in U.S. Pat. Nos. 3,170,991; 3,246,081; 3,249,696; 4,355,203; 4,748,669; and 5,440,638. While each of these techniques provides stereo separation, they do so with relatively complex and expensive circuitry.

Therefore, a need exists for a relatively simple and inexpensive stereo separation circuit.

DETAILED DESCRIPTION OF A PREFERRED EMBODIMENT

Generally, the present invention provides a stereo separation circuit that includes a pair of amplifiers and a pair of divider circuits. Each of the amplifiers is coupled to receive a stereo signal (e.g., a left stereo signal or a right stereo signal) and the output of the other amplifier through a portion of one of the divider circuits. The other portion of the divider circuit is coupled as feedback across an amplifier. A ratio between the feedback portion of the divider circuit and the other portion of the divider circuit provides a separation ratio. The greater the separation ratio, the greater the perceived audio separation of the stereo signals. By using a pair of amplifiers and a pair of divider circuits, a relatively simple and cost efficient stereo separation circuit is obtained.

Figure 1:
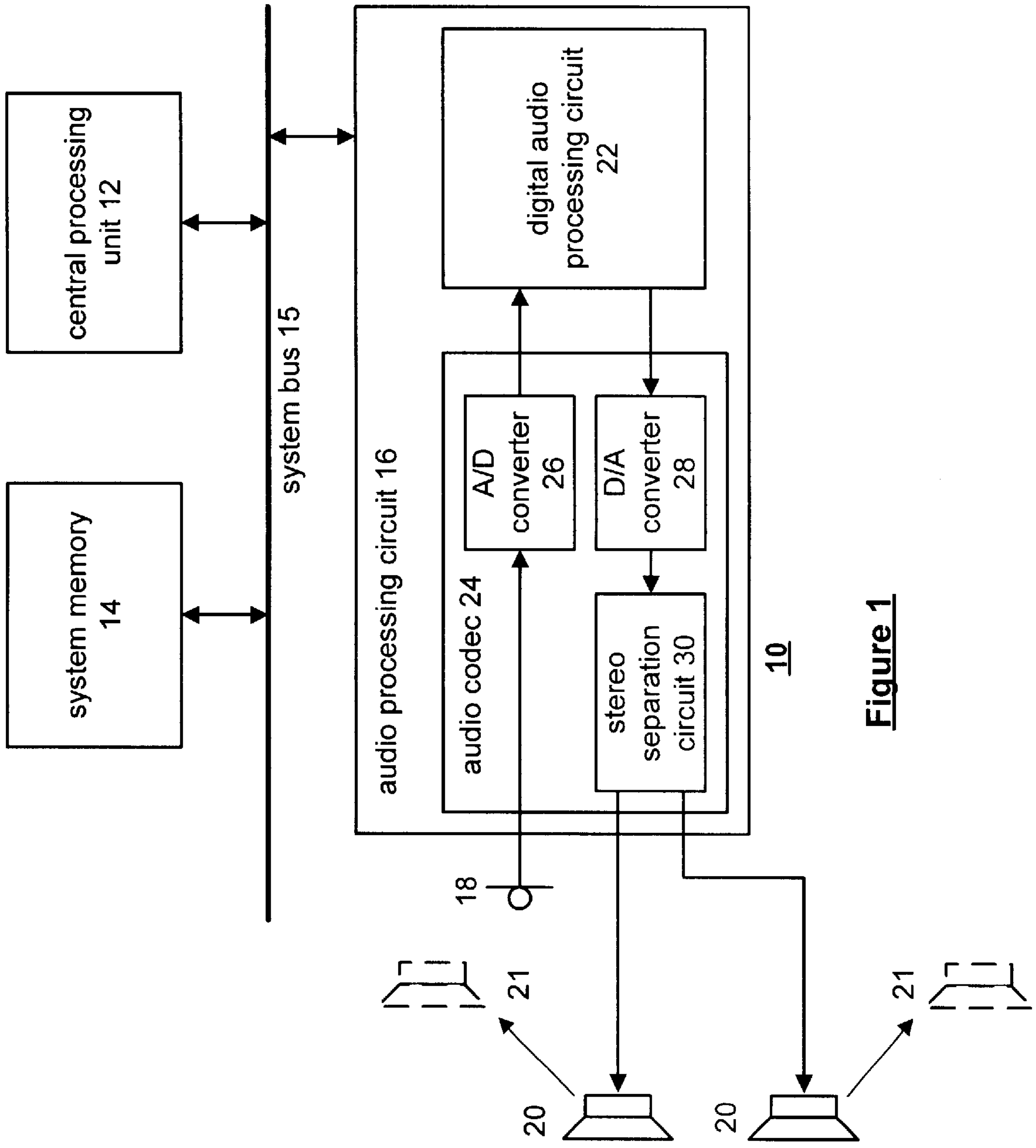
FIG. 1 illustrates a schematic block diagram of a computer system in accordance with the present invention.

The present invention can be more fully described with reference to FIGS. 1 through 5. FIG. 1 illustrates a schematic block diagram of a computer system 10 that includes a central processing unit 12, system memory 14, a system bus 15, an audio processing circuit 16, an audio input device 18 (e.g., a microphone, tape player, CD player, etc.), and a pair of speakers 20. The central processing unit 12, the system memory 14, and the system bus 15 are of the type that are typically found in a personal computer, laptop computer, workstation, personal digital assistance, and/or device that manipulates digital information based on programming instructions.

The audio processing circuit 16 includes a digital audio processing circuit 22 and an audio codec 24. The audio codec 24 includes an analog to digital converter 26, a digital to analog converter 28, and a separation circuit 30. The analog to digital converter 26 is operably coupled to receive analog audio signals from the audio input device 18. The analog to digital converter 26 converters the analog audio signal into a digitized audio signal, which is subsequently provided to the digital audio processing circuit 22. The digitized audio signal may be in a PCM (pulse code modulation) format, where the analog to digital converter 26 may use successive approximation, algorithmic conversion, and/or a flash comparison to achieve the conversion.

The digital to analog converter 28 is operably coupled to the digital audio processing circuit 22 and the stereo separation circuit 30. The digital to analog converter 28 receives digitized audio signals from the digital audio processing circuit 22 and converts them to analog audio signals. The digital to analog converter 28 may use R to 2R, current summing, and/or current steering to achieve the conversion. The converted analog signals are provided to the stereo separation circuit 30, which provides effective stereo separation signals to the speakers 20. The stereo separation provides the effect that the speakers 20 are further away from the listener and further apart from each other than they really are. As shown, if speakers 20 represent the physical relationship of the speakers, the dotted line speakers 21 illustrate the effective position of the speakers. The separation circuit 30 will be described in greater detail with reference to FIGS. 2 through 5.

The digital processing circuit 22 is further operably coupled to the system bus 15 such that it may process the digital audio signals as instructed by the central processing unit 12. For example, the digitized audio signals received via the audio input device 18 and the analog to digital converter 26 may be routed to the system memory 14 for storage, directed to the digital to analog converter 28 for immediate, or delayed, playback, or another operation as instructed by the central processing unit 12. As another example, the central processing unit 12 may retrieve stored digitized audio and provide it to the audio processing circuit 16 for playback. The stored digitized audio may have been stored in the system memory 14, retrieved from a CD drive, a DVD drive, or any other peripheral that provides a digitized audio signal to the central processing unit 12. As a further example, the central processing unit 12 may instruct the audio processing circuit 16 to synthesize a digitized audio signal. In this example, the audio processing circuit 12 would access a wave table, or the like, to create the digitized audio signal.

With the computer system 10 including the stereo separation circuit 30, a new type of computer is achieved. The computer 10 is now capable, with minimal additional circuitry and cost, to provide stereo separation, which is often referred to as 3D audio. In addition, a new audio processing circuit 16 is now available to provide stereo separation with minimal additional circuitry and cost. Note that the additional components may be further reduced by utilizing the driver amplifiers in the digital to analog converter 28 as the amplifiers in the stereo separation circuit 30. This last point will become more clear as the stereo separation circuit is described.

Figure 2:
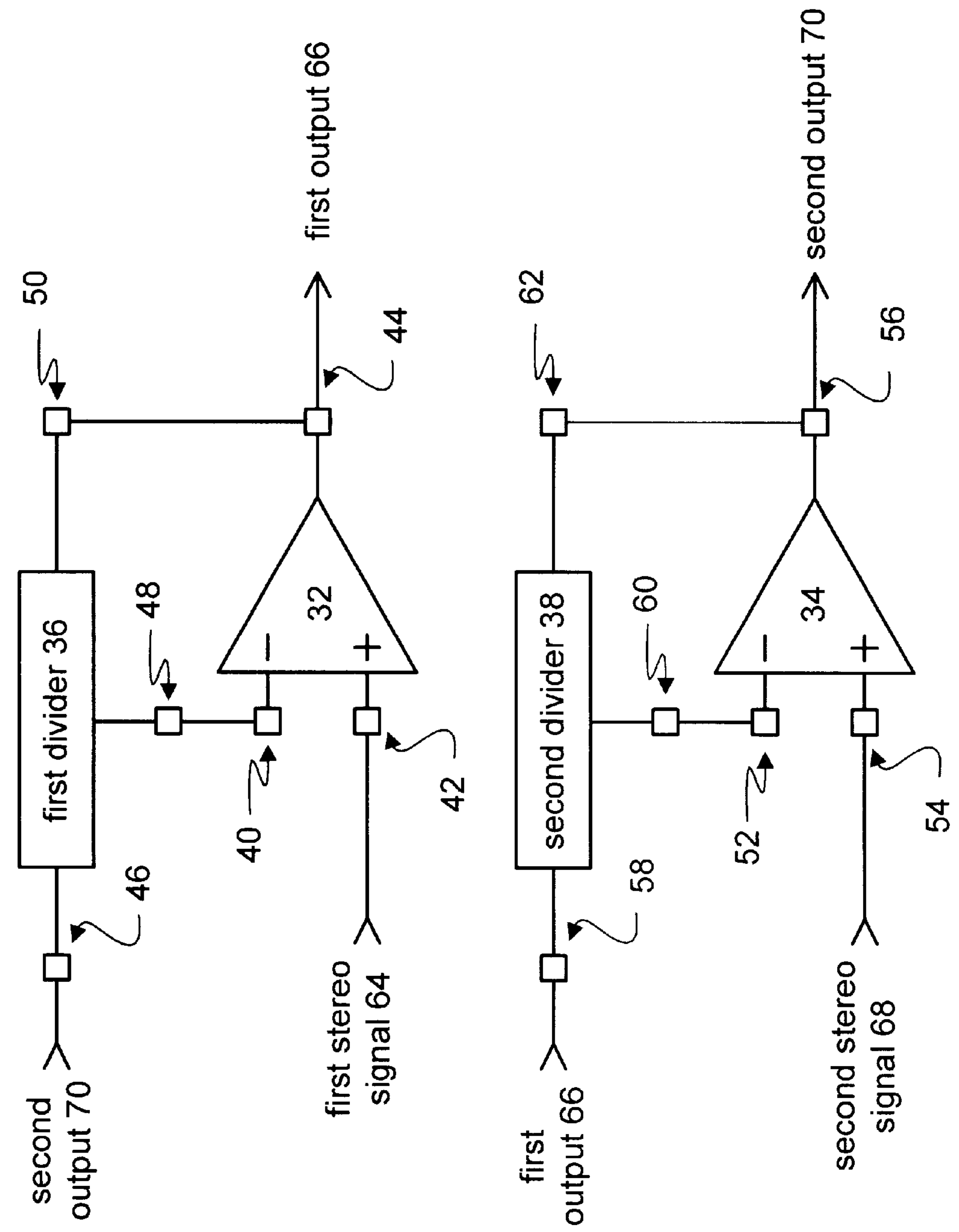
FIG. 2 illustrates a schematic block diagram of a stereo separation circuit in accordance with the present invention.

FIG. 2 illustrates a schematic block diagram of the stereo separation circuit 30. The stereo separation circuit 30 includes a first amplifier 32, a second amplifier 34, a first divider circuit 36, and a second divider circuit 38. The first amplifier 32 includes a pair of inputs 40 and 42, and an output 44. The second amplifier 34 includes a pair of inputs 52 and 54, and an output 56. Note that, while the inputs 40, 42, 52, and 54 are shown to have a positive and negative relationship, the positive and negative relationship is dependent on whether the amplifier is to function as an inverting amplifier or non-inverting amplifier. Further note that the stereo separation circuit 30 functions equally well with either type of amplifier.

The first divider 36 includes a beginning node 46, a tap node 48, and an ending node 50. The beginning node 46 is operably coupled to receive the second output 70 (i.e., the output of the second amplifier 34), the ending node 50 is operably coupled to the first output 66 (i.e., the output of the first amplifier 32), and the tap node 48 is operably coupled to input 40 of the first amplifier 32. In this configuration, the input 40 receives a proportional representation of the first and second outputs 66 and 70. The other input 42 of the first amplifier 32 is operably coupled to receive a first stereo input signal 64 (e.g., a left channel stereo signal).

The second divider 38 includes a beginning node 58, a tap node 60, and an ending node 62. The beginning node 58 is operably coupled to receive the first output 66, the ending node 62 is operably coupled to the second output 70, and the tap node 60 is coupled to input 52 of the second amplifier 34. In this configuration, the input 52 receives a proportional representation of the first and second outputs 66 and 70. The other input 54 of the second amplifier 34 is operably coupled to receive a second stereo input signal 68 (e.g., a right channel stereo signal).

In this configuration, the first and second outputs 66 and 70 are each a combination of the first and second stereo signals 64 and 68. In general, the combined output signals 66 and 70 may be obtained based on the equation of:

$$(Ro-Lo)/(Ro+Lo)=[(1+k)(Ri-Li)]/[(1-k)(Ri-Li)],$$

where k is the ratio between the divider portion between the tap node and the ending node (R1) and the divider portion between the beginning node and the tap node (R2) (i.e., k=R1/R2), Ri is the right stereo input signal, Li is the left stereo input signal, Ro is the right stereo output signal, Lo is the left stereo output signal, and (1+k)/(1−k) is the separation ratio. As an example of the relationship between the equation and the elements of FIG. 2, Li is the first stereo signal 64, Lo is the first output 66, Ri is the second stereo input 68, and Ro is the second output 70.

As can be deduced from the equation, the separation effect is dependent upon the divider ratio of the divider circuits 36 and 38. As such, the divider circuits 36 and 38 may include a pair of resistors, a multi-tap resistive network, switch capacitor circuits, variable impedance elements (e.g., programmable switch capacitor circuits, potentiometers, etc.), and/or a combination thereof.

Figure 3:
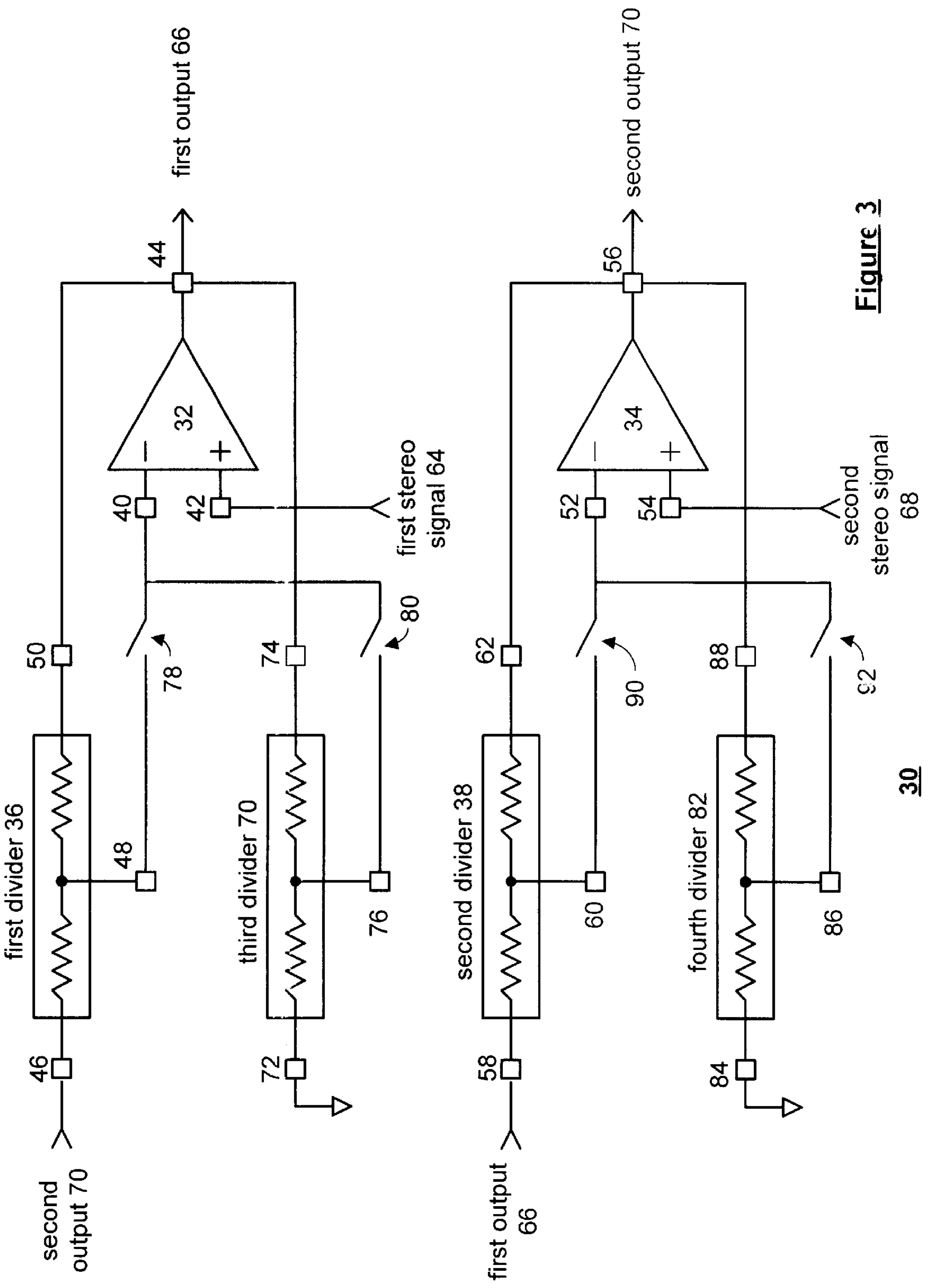
FIG. 3 illustrates a schematic block diagram of an alternate stereo separation circuit in accordance with the present invention.

FIG. 3 illustrates a schematic block diagram of the stereo separation circuit 30 that includes resistors as the components of the first and second divider circuits 36 and 38. This embodiment of the stereo separation circuit 30 further includes a third divider 70, a fourth divider 82, and a switching circuit that includes a plurality of switches 78, 80, 90, and 92. In this configuration, stereo separation is programmable. In other words, the stereo separation may be enabled or disabled. To enable the stereo separation, switches 78 and 90 are closed via a stereo separation enable signal, while switches 80 and 92 are opened via the stereo separation enable signal. When enabled, the stereo separation circuit 30 operates as discussed above.

When switches 80 and 92 are closed via a stereo separation disable signal and switches 78 and 90 are opened via the stereo separation disable signal, the stereo separation option is disabled. With the switches coupled in this manner, the tap nodes 76 and 86 of the third and fourth dividers 70 and 82 are coupled to inputs 40 and 52 of the amplifiers 32 and 34; the beginning nodes 72 and 84 are coupled to a circuit reference (e.g., ground, 0 volts, −5 volts, −3 volts, etc.), and the ending nodes 74 and 88 are coupled to the outputs 44 and 56. As such, the first amplifier 32 functions as a non-inverting amplifier (when the polarity of the inputs is as shown) for the first stereo signal 64 and the second amplifier 34 functions as a non-inverting amplifier (when the polarity of the inputs is as shown) for the second stereo signal 68. As such, each amplifier 32 and 34 is primarily acting as a buffer, or driver. Thus, by making the stereo separation a selectable option, the first and second amplifiers 32 and 34 may be the output drivers of the digital to analog converter 28, thereby further reducing the additional circuitry needed. Further note that by coupling the switches 78, 80, 90, and 92 to the inputs of the amplifiers, no appreciable current flows through the switches, which prevents distortion of the input stereo signals 64 and 68 that would occur if the switches were current bearing.

Figure 4:
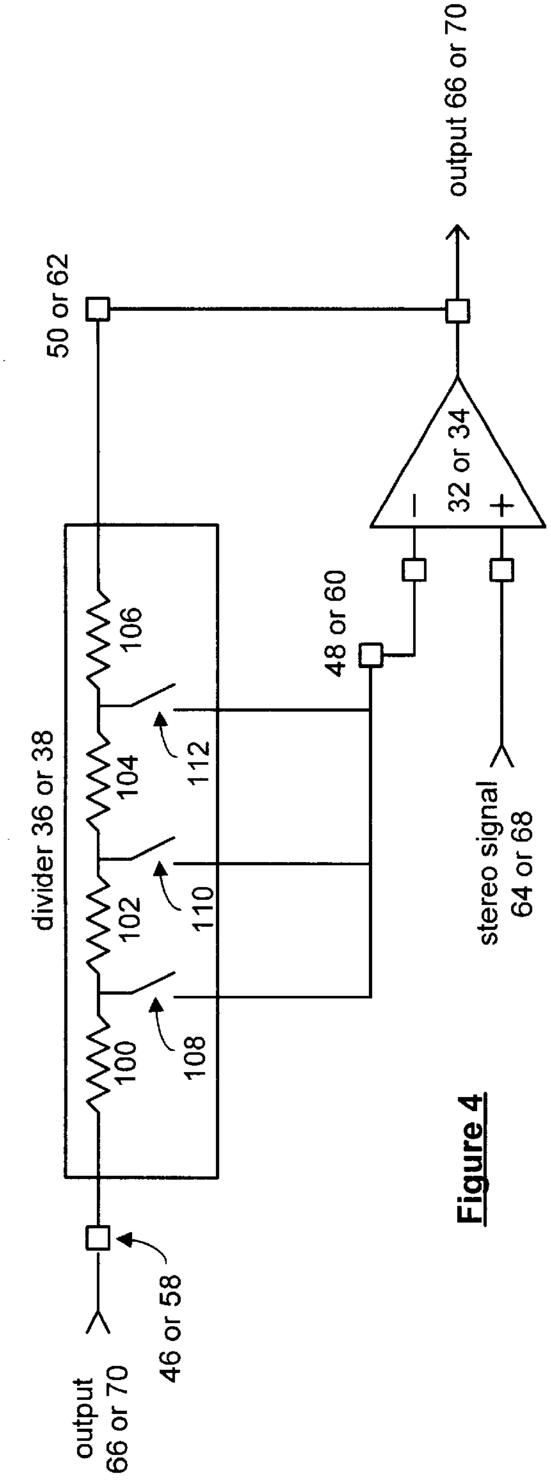
FIG. 4 illustrates a schematic block diagram of another alternate stereo separation circuit in accordance with the present invention.

FIG. 4 illustrates a portion of the stereo separation circuit 30, which may represent either a first portion (i.e., the part that includes the first amplifier 32) or a second portion (i.e., the part that includes the second amplifier 34). As shown, the divider circuit 36 or 38 includes a plurality of resistors 100, 102, 104, and 106 and a switching circuit that includes a plurality of switches 108, 110, and 112. In this configuration, the separation ratio is selectable based on which switch is closed. For example, assume that resistor 100 is a 17.5K ohm resistor, resistor 102 is a 1.25K ohm resistor, resistor 104 is a 1.25K ohm resistor, and resistor 106 is a 10K resistor. Given these values, when switch 108 is closed and switches 110 and 112 are open, the separation ratio is 6 ([1+12.5/17.5]/[1−12.5/17.5]=[1+0.7143]/[1−0.7143]=1.7143/0.2857=6). Recall that the separation ratio is (1+k)/(1−k), where k is R1/R2. When switch 110 is closed and switches 108 and 112 are open, the separation ratio is 4.5 and when switch 112 is closed and switches 108 and 110 are open, the separation ratio is 3. As one of average skill in the art will readily appreciate, the divider circuits 36 and 38 may include more are less resistors and corresponding switches to provide more or less selectable separation ratios.

Figure 5:
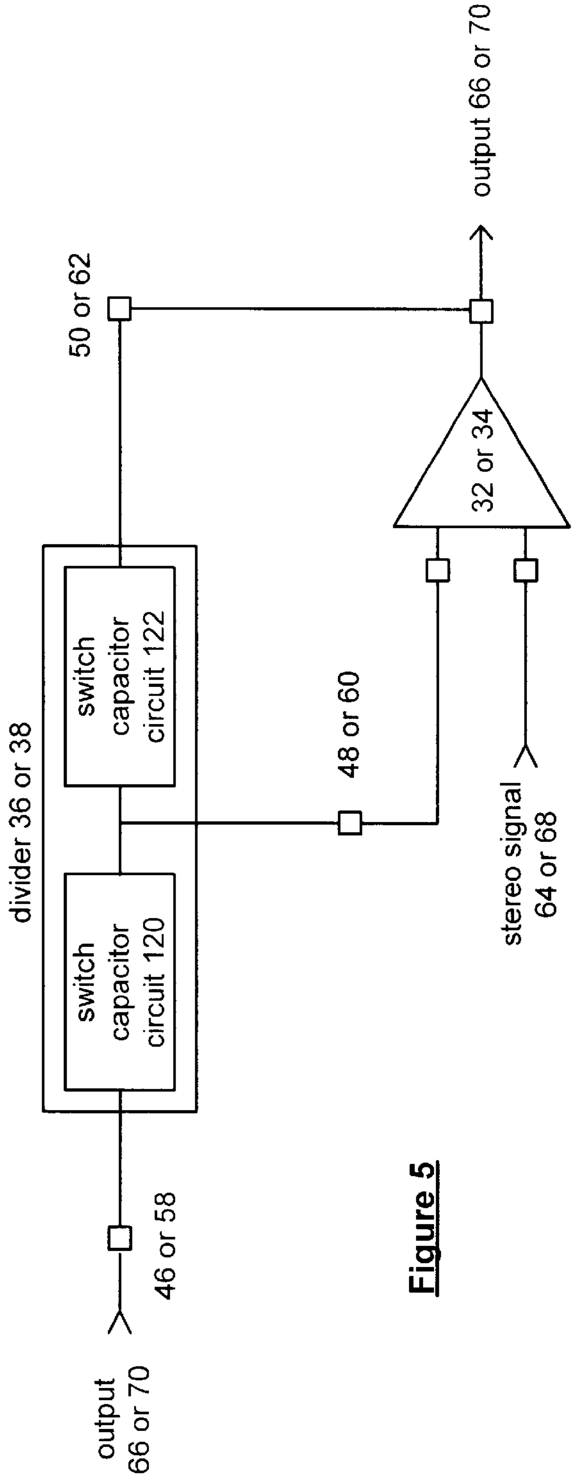
FIG. 5 illustrates a schematic block diagram of yet another alternate stereo separation circuit in accordance with the present invention.

FIG. 5 illustrates a portion of the stereo separation circuit 30, which may represent either a first portion (i.e., the part that includes the first amplifier 32) or a second portion (i.e., the part that includes the second amplifier 34). As shown, the divider circuit 36 or 38 includes a plurality of switch capacitor circuits 120 and 122 to provide the impedances R1 and R2. At least one of the switch capacitor circuits (e.g., 120) is connected between the beginning node 46 or 58 and the tap node 48 or 60 and at least one other of the switch capacitor circuits (e.g., 122) is connected between the tap node 48 or 60 and the ending node 50 or 62. The switching ratio between the switch capacitor circuits 120 and 122 provide an impedance ratio, which, in turn provides at least a portion of an effective separation, i.e., the separation ratio.

Given the nature of switch capacitor circuits, the polarity of the inputs of amplifier 32 and 34 may need to be reversed, in comparison to when the divider circuits include resistors. One of average skill in the art will be able to select the appropriate polarity of the amplifier inputs.

The preceding discussion has described a stereo separation circuit and applications thereof. The described stereo separation circuit may be implemented using few components, thereby reducing its complexity and cost in relation to previous stereo separation circuit implementations. While the embodiments of FIGS. 2–5 were discussed separately, one of average skill in the art will appreciate that the embodiments may be combined to achieve further embodiments of the stereo separation circuit. For example, the embodiment of FIG. 3 may be combined with the embodiment of FIG. 4 and/or the embodiment of FIG. 5.

What is claimed is:

1. A stereo separation circuit comprises:

a first amplifier having a first pair of inputs and a first output, wherein one of the first pair of inputs is operably coupled to receive a first stereo signal;

a second amplifier having a second pair of inputs and a second output, wherein one of the second pair of inputs is operably coupled to receive a second stereo signal;

a first divider circuit having a first beginning node, a first tap node, and a first ending node, wherein the first beginning node is operably coupled to the second output, the first tap node is operably coupled to another one of the first pair of inputs, and the first ending node is operably coupled to the first output; and a second divider circuit having a second beginning node, a second tap node, and a second ending node, wherein the second beginning node is operably coupled to the first output, the second tap node is operably coupled to another one of the second pair of inputs, and the second ending node is operably coupled to the second output.

2. The stereo separation circuit of claim 1, wherein the first divider further comprises a plurality of switch capacitors circuits, wherein at least one switch capacitor circuit of the plurality of switch capacitor circuits is connected between the first beginning node and the first tap node, wherein at least one other switch capacitor circuit of the plurality of switch capacitor circuits is connected between the first tap node and the first ending node, and wherein a switching ratio between the at least one switch capacitor circuit and the at least one other switch capacitor circuit provides at least a portion of a separation ratio.

3. The stereo separation circuit of claim 1, wherein the second divider further comprises a plurality of switch capacitors circuits, wherein at least one switch capacitor circuit of the plurality of switch capacitor circuits is connected between the second beginning node and the second tap node, wherein at least one other switch capacitor circuit of the plurality of switch capacitor circuits is connected between the second tap node and the second ending node, and wherein a switching ratio between the at least one switch capacitor circuit and the at least one other switch capacitor circuit provides at least a portion of a separation ratio.

4. The stereo separation circuit of claim 1, wherein the first and second dividers each further comprise a resistive divider network, wherein a ratio between resistors of the resistive divider network provides a separation ratio.

5. The stereo separation circuit of 4, wherein the resistor divider network comprises a plurality of resistors and a plurality of switches to provide selectable separation ratios.

6. The stereo separation circuit of claim 1 further comprises:

a third divider circuit having a third beginning node, a third tap node, and a third ending node, wherein the third beginning node is operably coupled to a circuit reference, the third tap node is operably coupled to the another one of the first pair of inputs, and the third ending node is operably coupled to the first output;

a fourth divider circuit having a fourth beginning node, a fourth tap node, and a fourth ending node, wherein the fourth beginning node is operably coupled to the circuit reference, the fourth tap node is operably coupled to the another one of the second pair of inputs, and the fourth ending node is operably coupled to the second output; and a switching circuit operably coupled to the first and second amplifiers and to the first, second, third, and fourth divider circuits, wherein the switching circuit provides the operable coupling of the first and second tap nodes to the another one of the first and second pair of inputs when a stereo separation signal is enabled, and wherein the switching circuit provides the operable coupling of the third and fourth tap nodes to the another one of the first and second pair of inputs when the stereo separation signal is disabled.

7. The stereo separation circuit of claim 6, wherein the switching circuit further comprises a plurality of switches.

8. The stereo separation circuit of claim 1, wherein the first divider further comprises a first adjustable impedance between the first beginning node and the first tap node and wherein the second divider further comprises a second adjustable impedance between the second beginning node and the second tap node.

9. An audio codec comprises:

an analog to digital converter section operably coupled to receive an analog input signal and to produce a digital representation thereof;

a digital to analog converter operably coupled to receive a digitized analog signal and to produce an analog representation thereof; and a stereo separation circuit operably coupled to the digital to analog converter, wherein the stereo separation circuit includes:

a first amplifier having a first pair of inputs and a first output, wherein one of the first pair of inputs is operably coupled to receive a first stereo signal of the analog representation;

a second amplifier having a second pair of inputs and a second output, wherein one of the second pair of inputs is operably coupled to receive a second stereo signal of the analog representation;

a first divider circuit having a first beginning node, a first tap node, and a first ending node, wherein the first beginning node is operably coupled to the second output, the first tap node is operably coupled to another one of the first pair of inputs, and the first ending node is operably coupled to the first output; and a second divider circuit having a second beginning node, a second tap node, and a second ending node, wherein the second beginning node is operably coupled to the first output, the second tap node is operably coupled to another one of the second pair of inputs, and the second ending node is operably coupled to the second output.

10. The audio codec of claim 9, wherein the first divider further comprises a plurality of switch capacitors circuits, wherein at least one switch capacitor circuit of the plurality of switch capacitor circuits is connected between the first beginning node and the first tap node, wherein at least one other switch capacitor circuit of the plurality of switch capacitor circuits is connected between the first tap node and the first ending node, and wherein a switching ratio between the at least one switch capacitor circuit and the at least one other switch capacitor circuit provides at least a portion of a separation ratio.

11. The audio codec of claim 9, wherein the second divider further comprises a plurality of switch capacitors circuits, wherein at least one switch capacitor circuit of the plurality of switch capacitor circuits is connected between the second beginning node and the second tap node, wherein at least one other switch capacitor circuit of the plurality of switch capacitor circuits is connected between the second tap node and the second ending node, and wherein a switching ratio between the at least one switch capacitor circuit and the at least one other switch capacitor circuit provides a portion of a separation ratio.

12. The audio codec of claim 9, wherein the first and second dividers each further comprise a resistive divider network, wherein a ratio between resistors of the resistive divider network provides a separation ratio.

13. The audio codec of claim 9 further comprises:

a third divider circuit having a third beginning node, a third tap node, and a third ending node, wherein the third beginning node is operably coupled to a circuit reference, the third tap node is operably coupled to the another one of the first pair of inputs, and the third ending node is operably coupled to the first output;

a fourth divider circuit having a fourth beginning node, a fourth tap node, and a fourth ending node, wherein the fourth beginning node is operably coupled to the circuit reference, the fourth tap node is operably coupled to the another one of the second pair of inputs, and the fourth ending node is operably coupled to the second output; and a switching circuit operably coupled to the first and second amplifiers and to the first, second, third, and fourth divider circuits, wherein the switching circuit provides the operable coupling of the first and second tap nodes to the another one of the first and second pair of inputs when a stereo separation signal is enabled, and wherein the switching circuit provides the operable coupling of the third and fourth tap nodes to the another one of the first and second pair of inputs when the stereo separation signal is disabled.

14. The stereo separation circuit of claim 9, wherein the first divider further comprises a first adjustable impedance between the first beginning node and the first tap node and wherein the second divider further comprises a second adjustable impedance between the second beginning node and the second tap node.

15. An audio processing circuit comprises:

digital audio processing circuit that processes digitized audio; and an audio codec operably coupled to the digital audio processing circuit, wherein the audio codec includes:

an analog to digital converter section operably coupled to receive an analog input signal and to produce a digital representation thereof;

a digital to analog converter operably coupled to receive a digitized analog signal and to produce an analog representation thereof, and a stereo separation circuit operably coupled to the digital to analog converter, wherein the stereo separation circuit includes:

a first amplifier having a first pair of inputs and a first output, wherein one of the first pair of inputs is operably coupled to receive a first stereo signal of the analog representation;

a second amplifier having a second pair of inputs and a second output, wherein one of the second pair of inputs is operably coupled to receive a second stereo signal of the analog representation;

a first divider circuit having a first beginning node, a first tap node, and a first ending node, wherein the first beginning node is operably coupled to the second output, the first tap node is operably coupled to another one of the first pair of inputs, and the first ending node is operably coupled to the first output; and a second divider circuit having a second beginning node, a second tap node, and a second ending node, wherein the second beginning node is operably coupled to the first output, the second tap node is operably coupled to another one of the second pair of inputs, and the second ending node is operably coupled to the second output.

16. The audio processing circuit of claim 15, wherein the audio codec further comprises:

a third divider circuit having a third beginning node, a third tap node, and a third ending node, wherein the third beginning node is operably coupled to a circuit reference, the third tap node is operably coupled to the another one of the first pair of inputs, and the third ending node is operably coupled to the first output;

a fourth divider circuit having a fourth beginning node, a fourth tap node, and a fourth ending node, wherein the fourth beginning node is operably coupled to the circuit reference, the fourth tap node is operably coupled to the another one of the second pair of inputs, and the fourth ending node is operably coupled to the second output; and a switching circuit operably coupled to the first and second amplifiers and to the first, second, third, and fourth divider circuits, wherein the switching circuit provides the operable coupling of the first and second tap nodes to the another one of the first and second pair of inputs when a stereo separation signal is enabled, and wherein the switching circuit provides the operable coupling of the third and fourth tap nodes to the another one of the first and second pair of inputs when the stereo separation signal is disabled.

17. A computer system comprises:

a central processing unit;

system memory operably coupled to the central processing unit; and an audio processing circuit operably coupled to the central processing unit and the system memory, wherein the audio processing circuit includes:

digital audio processing circuit that processes digitized audio; and an audio codec operably coupled to the digital audio processing circuit, wherein the audio codec includes:

an analog to digital converter section operably coupled to receive an analog input signal and to produce a digital representation thereof;

a digital to analog converter operably coupled to receive a digitized analog signal and to produce an analog representation thereof; and a stereo separation circuit operably coupled to the digital to analog converter, wherein the stereo separation circuit includes:

a first amplifier having a first pair of inputs and a first output, wherein one of the first pair of inputs is operably coupled to receive a first stereo signal of the analog representation;

a second amplifier having a second pair of inputs and a second output, wherein one of the second pair of inputs is operably coupled to receive a second stereo signal of the analog representation;

a first divider circuit having a first beginning node, a first tap node, and a first ending node, wherein the first beginning node is operably coupled to the second output, the first tap node is operably coupled to another one of the first pair of inputs, and the first ending node is operably coupled to the first output; and a second divider circuit having a second beginning node, a second tap node, and a second ending node, wherein the second beginning node is operably coupled to the first output, the second tap node is operably coupled to another one of the second pair of inputs, and the second ending node is operably coupled to the second output.

18. The computer system of claim 17, wherein the audio codec further comprises:

a third divider circuit having a third beginning node, a third tap node, and a third ending node, wherein the third beginning node is operably coupled to a circuit reference, the third tap node is operably coupled to the another one of the first pair of inputs, and the third ending node is operably coupled to the first output;

a fourth divider circuit having a fourth beginning node, a fourth tap node, and a fourth ending node, wherein the fourth beginning node is operably coupled to the circuit reference, the fourth tap node is operably coupled to the another one of the second pair of inputs, and the fourth ending node is operably coupled to the second output; and a switching circuit operably coupled to the first and second amplifiers and to the first, second, third, and fourth divider circuits, wherein the switching circuit provides the operable coupling of the first and second tap nodes to the another one of the first and second pair of inputs when a stereo separation signal is enabled, and wherein the switching circuit provides the operable coupling of the third and fourth tap nodes to the another one of the first and second pair of inputs when the stereo separation signal is disabled.

* * * * *